(12) United States Patent
Wills

(10) Patent No.: US 6,830,499 B1
(45) Date of Patent: Dec. 14, 2004

(54) BEEHIVE FEEDER

(76) Inventor: Robert Earl Wills, 221 15th Court North, Birmingham, AL (US) 35204

( * ) Notice: Subject to any disclaimer, the term of this patent is extended or adjusted under 35 U.S.C. 154(b) by 0 days.

(21) Appl. No.: 10/727,593

(22) Filed: Dec. 5, 2003

(51) Int. Cl.[7] ............................................. A01K 53/00
(52) U.S. Cl. .................. 449/2; 449/9; 449/48
(58) Field of Search ............................ 449/2, 9, 10, 11, 449/29, 30, 48

(56) References Cited

U.S. PATENT DOCUMENTS

| | | | |
|---|---|---|---|
| 14,168 A | 1/1856 | Robertson | 449/10 |
| 69,428 A | 10/1867 | Harrison | 449/10 |
| 183,650 A | 10/1876 | Davis et al. | 449/10 |
| 215,569 A * | 5/1879 | Byrd et al. | 449/9 |
| 337,097 A * | 3/1886 | Vincent | 449/9 |
| 371,581 A * | 10/1887 | Hastings | 449/48 |
| 1,056,783 A | 3/1913 | Enhelder | 449/10 |
| 3,343,186 A | 9/1967 | Dunand | 449/9 |
| 3,438,070 A * | 4/1969 | Florance | 449/2 |
| 4,214,329 A | 7/1980 | Kozlowicz | 449/9 |
| 4,250,581 A | 2/1981 | Kindall | 449/9 |

FOREIGN PATENT DOCUMENTS

| | | |
|---|---|---|
| FR | 2578389 | 9/1986 |
| FR | 2597715 | 10/1987 |

* cited by examiner

*Primary Examiner*—Robert P. Swiatek
(74) *Attorney, Agent, or Firm*—Kramer & Amado, P.C.

(57) ABSTRACT

A device for feeding bees, comprising a rigid heat-absorptive housing having a chamber therein, where the chamber has a bottom surface with a plurality of holes passing therethrough. The housing has an access port which allows a viscous syrup to be poured into the chamber. The port may be reversibly sealed. The device further includes a system for mounting said housing on top of a beehive. The plurality of holes in the bottom of the chamber are large enough to allow a bee to access the viscous syrup through the holes, but small enough to prevent the viscous syrup from dripping through the holes.

17 Claims, 5 Drawing Sheets

BEEHIVE FEEDER

FIELD OF THE INVENTION

This invention relates to a novel device for feeding nesting insects. More particularly, it relates to a device for holding a palatable syrup in proximity to a hive so that it may safely be accessed by bees within the hive. It further relates to a feeding device for bees which may be conveniently refilled without opening the hive.

BACKGROUND OF THE INVENTION

Bees are commonly cultivated in hives to obtain honey and to pollinate crops. The architecture of a common beehive will be described here. In the lower part of the hive is the brood chamber. The brood chamber is a rectangular box, or hive body, filled with frames. These frames are hung inside the brood chamber. Each frame is made from a rigid rectangular support for a thin sheet of beeswax with a hexagonal pattern pressed into it, or for a plastic sheet coated with a thin layer of wax. This sheet serves as a foundation on which the bees will build their comb. The brood chamber serves as a housing for the queen bee and her colony. The queen bee lays eggs in the cells of the comb in the brood chamber. An opening in the bottom of the brood chamber allows the worker bees to leave the hive.

The top of the brood chamber is covered with a grill with bars spaced just far enough apart that worker bees, but not queen bees, can pass therethrough. This grill, known as a queen excluder, prevents the queen bee from leaving the brood chamber. A second hive body filled with frames is positioned above the brood chamber. The worker bees will construct comb on the frames in the second hive body. Since the queen excluder prevents the queen from entering this second hive body to lay eggs, the cells of the comb in the second hive body will be used by the worker bees to store honey. When the comb in this second hive body is full of honey, the second hive body may be removed and replaced with new hive body containing a new set of frames.

During months when bees are active but the plants, which serve as their source of food, are not producing nectar or flowering, the bees in the hive feed on the honey therein. Generally, this occurs during fall and winter. As a result, bee keepers normally supply the bees with an alternate food source so they will not consume honey from the hive, and to prevent bee starvation from a lack of stored honey in the hive. This has involved making appropriate feeding solutions, such as sugar solutions or syrup, available to the bees. While feeding sugar solution or syrup to bees prevents them from starving, the bee keepers are frequently forced to develop awkward devices to feed the bees. Many of these devices have significant disadvantages, such as a lack of insulation, which allows a significant amount of heat to be lost from the hive. In cooler climates, this loss of heat is important because it significantly affects bee productivity. Bees typically must have a thoracic temperature of approximately 85° F. to sustain flight. If the hive temperature falls significantly below this level, the bees will be unable to fly from the hive to feed from plants. As a result, honey production declines and they will be unable to fulfill their role in plant pollination. Additionally, if the hive temperature drops below 64° F., honey bees cluster, packing together into a carefully structured, compact ball. This allows the bees to survive cold weather, but reduces honey production. Thus, for maximum honey productivity, it is important that the bee feeder on the hive should not allow the hive temperature to drop significantly.

Several devices for feeding bees have been proposed. Kindall, in U.S. Pat. No. 4,250,581, discloses a container for a liquid bee syrup which takes the form of a container with a single opening. The opening is closed with a cover having holes to allow bees within a hive to access the syrup. The container is placed on top of a hive, with the covered opening directed downwardly into the hive. The container is refilled by removing the feeder from the hive and refilling the container through the opening. This has the disadvantage that the bees inside the hive are exposed to the outside environment while refilling the feeder. In colder weather, this can result in a dramatic reduction in hive temperature. Additionally, the device must be removed from the hive in order to refill it, thereby increasing the likelihood of disturbing the hive and agitating the bees. This can cause the bees to sting the beekeeper.

U.S. Pat. No. 4,214,329, issued to Kozlowwicz, shows a bee feeder comprising a molded plastic receptacle adapted to be mounted on top of a hive body. The receptacle includes side walls cooperatively defining a rectangular shape and a bottom wall that extends between the side walls to define an upwardly opening trough for receiving liquid feed. A hollow projection with an upwardly-directed opening extends from the bottom wall within the interior of the receptacle, allowing bees to pass through the bottom wall of the feeder. The bees are therefore able to pass back and forth from the hive to the feeder. A grid covers the projection opening in a spaced relationship, extending downwardly to the bottom wall in a spaced relationship to the projection. The bees gain access to the feed by crawling between the grid and the projection to the feed within the trough. The feeder has the disadvantages that the trough is open to the air, allowing contaminants to enter the feed. Also, the hollow projection in the feeder includes an opening directly into the hive. This provides a route for heat to be lost from the hive through the feeder.

U.S. Pat. No. 1,056,783, issued to Enfelder, shows a bee feeder comprising a box with a top opening covered with a sliding cover, allowing the feeder to be filled with solid sugar grains. The box is positioned over an opening in the top of a hive, and a screen at the bottom of the box retains the sugar in the box, while allowing the bees to reach the sugar. The box is not intended to contain liquid food; in fact, to prevent liquid from building up in the hive, a port is provided in the top of the box through which liquid may be drained. This process has two disadvantages: first, food may be spilled through the port during the drainage process, resulting in waste of the bee food; and second, each time the feeder is drained, the feeder must be removed from the hive. This exposes the bees inside the hive to the outside environment, resulting in potential cooling of the hive. Further, removal of the feeder may disturb the hive, resulting in a greater likelihood of the bee keeper being stung.

There is currently an unmet need for a safer bee feeder that allows the beekeeper to conveniently refill the feeder without significant risk of agitating the bees within the hive.

Further, there is a need for a bee feeder that does not expose the interior of the hive to extreme environmental changes.

The current invention provides an improved bee feeder, which overcomes the disadvantages of the prior art.

SUMMARY OF THE INVENTION

In light of the present need for an improved bee feeder, a brief summary of the present invention is presented. Some simplifications and omission may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

The current invention provides a device for feeding bees nesting in an artificial hive structure. The device holds a quantity of liquid food for bees, without allowing the food to drip into the hive and drown the bees. The device can be conveniently filled and refilled with minimal risk of stings to the beekeeper, without opening the hive. Additionally, the device may be thermally insulated to prevent loss of heat through the feeder.

More particularly, the inventive device for feeding bees is constructed with a rigid heat-absorptive housing or hive body. Inside the housing is a chamber for holding a supply of viscous syrup which is palatable to bees. The chamber has a bottom surface with a plurality of holes passing therethrough. These holes are large enough to allow a bee to access the viscous syrup through the holes, but small enough to prevent the viscous syrup from dripping therethrough. An access port in said housing allows the viscous syrup to be poured into the chamber. A means for mounting said housing on top of a beehive is also provided.

The current invention provides an improved bee feeding device having a simple construction which avoids the disadvantages of the prior art. The new feeder is not firmly mounted to the bee hive. The feeder may be refilled without removing the feeder from the hive or exposing the hive to the outside environment.

BRIEF DESCRIPTION OF THE DRAWINGS

In order to better understand the present invention, reference is made to the accompanying drawings, wherein.

DESCRIPTION OF THE PREFERRED EMBODIMENTS

Figure 1:
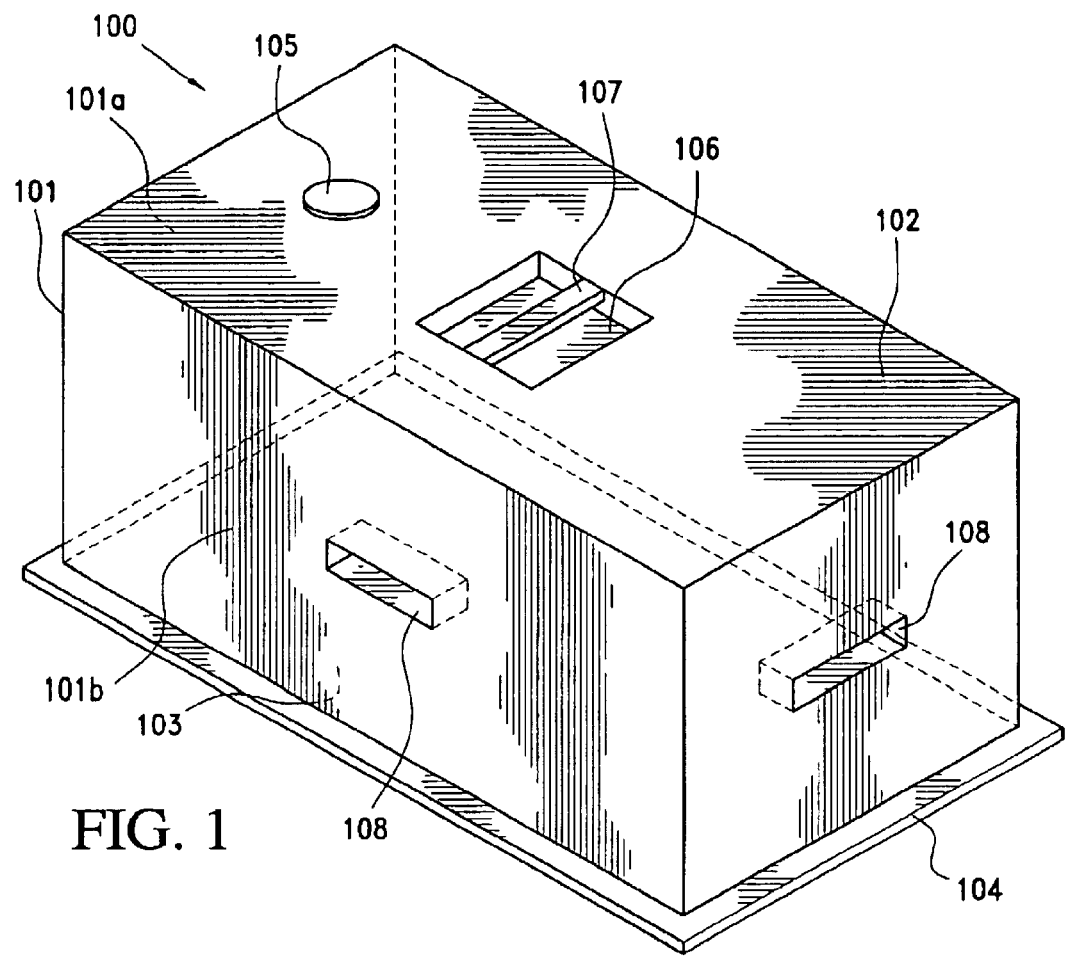
FIG. 1 shows a view of the inventive bee feeder.

Referring now to the drawings, in which like numerals refer to like components or steps, there are disclosed broad aspects of the preferred embodiments of the present invention. As shown in FIG. 1, the current invention has a housing 100. Housing 100 has a top surface 102, a bottom surface 103, and a side wall 101, where these walls define a chamber within the housing. As shown in FIG. 1, the housing may take the shape of a box, with side wall 101 comprising two long side walls 101b and two shorter end walls 101a. Bottom surface 103 and top surface 102 are then rectangular. However, this is not required; the housing 100 may, if desired, be constructed from a circular or oval top 102, a circular or oval bottom 103, with a cylindrical side wall 101 therebetween. The housing 100 may also be polygonal, with between three and eight sides. Housing 100 is preferably made of a heat absorptive plastic material. Useful materials for manufacture of the housing include polypropylene, high density polyethylene, polystyrene, and polyester. High-strength composite materials, such as polypropylene reinforced with glass or polyester netting or fibers, may also be used in construction of the housing. These materials may be made heat absorptive by coloring the materials a dark color, preferably black. This may be done by adding a colored filler, such as carbon black, iron oxide, or bone black to the plastic. Alternatively, the housing may be painted black or covered with a layer of a dark material, which may be a fabric, black paper, or black plastic.

Figure 4:
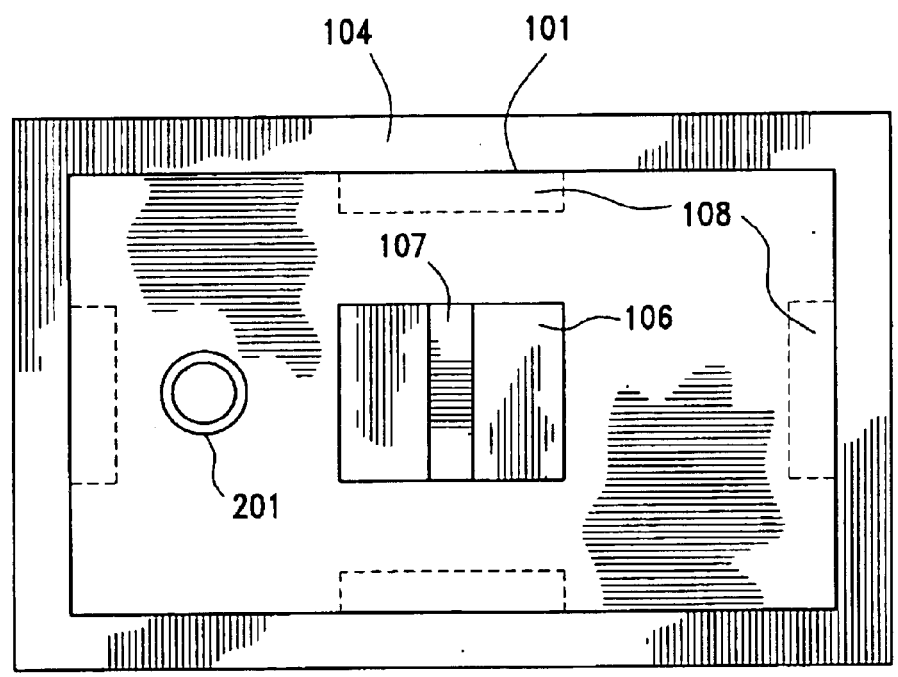
FIG. 4 shows a top view of the inventive bee feeder.

In one embodiment of the current invention, flange 104 extends from the side wall 101 of the housing 100, and may be used to position the bee feeder on the top of an artificial hive body (not shown in FIG. 1). At least two hand grips 108 are present in the side wall 101, positioned on opposite sides of wall 101. In the embodiment pictured in FIG. 1, one grip 108 is present in each short wall 101a, and one grip 108 is present in each long wall 101b. A handle 107 is positioned on the top surface 102, allowing a bee keeper to conveniently carry the empty feeder from place to place. In a preferred embodiment, a well 106 is present in top surface 102, and handle 107 is recessed within the well. An alternative view of the feeder providing a better view of well 106 and handle 107 is shown in FIG. 4. Handle 107 may be used to conveniently carry the empty bee feeder from place to place. Alternatively, if the bee feeder is filled with syrup for the bees, the feeder is heavier and the bee keeper may prefer to carry the feeder using grips 108.

Figure 2:
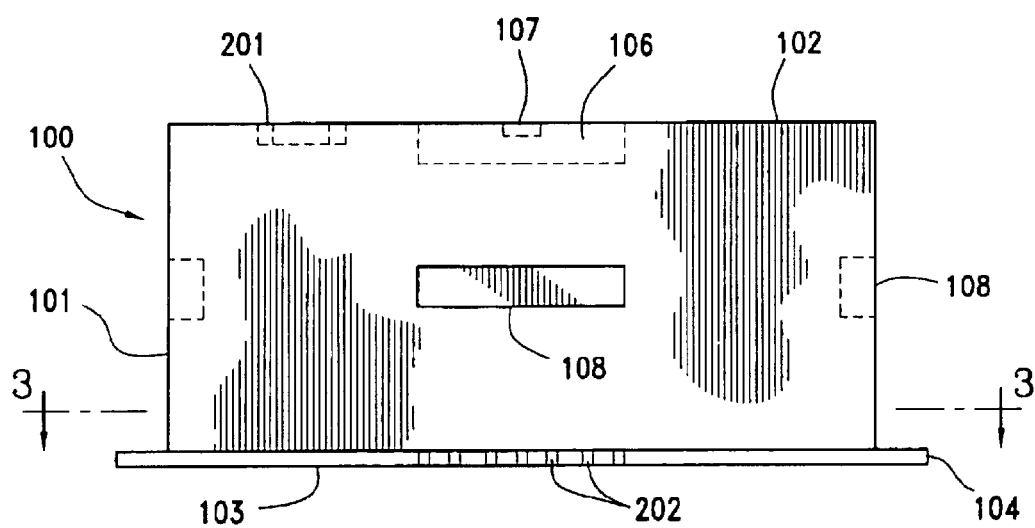
FIG. 2 shows a side view of the inventive bee feeder.

As shown in FIG. 2, a port 201 is present in the top surface 102 of the housing. The port 201 allows a syrup which is palatable to bees to be poured into the chamber within housing 100. This port is sealed in an air-tight fashion with a removable cover 105, shown in FIG. 1. In the embodiment of FIG. 2, the inner surface of port 201 is a threaded female joint; such a port is conveniently sealed with a cover 105 having a threaded male joint which mates with the threaded female joint on port 201. Alternatively, port 201 may be a non-threaded joint, and a stopper may be used as a cover 105. Another possibility is the use of a cover 105 which releasably snaps into position over port 201. This may be done by providing a circumferential ridge on the outer surface of cover 105 and a corresponding circumferential furrow on the inner surface of port 201. Then, when cover 105 is fitted into port 201, the ridge will reversibly snap into the furrow. Referring to FIG. 2 again, a plurality of holes 202 is present in the bottom 103 of the housing 100. As shown in the figure, the holes pass entirely through the bottom of the feeder.

Figure 3:
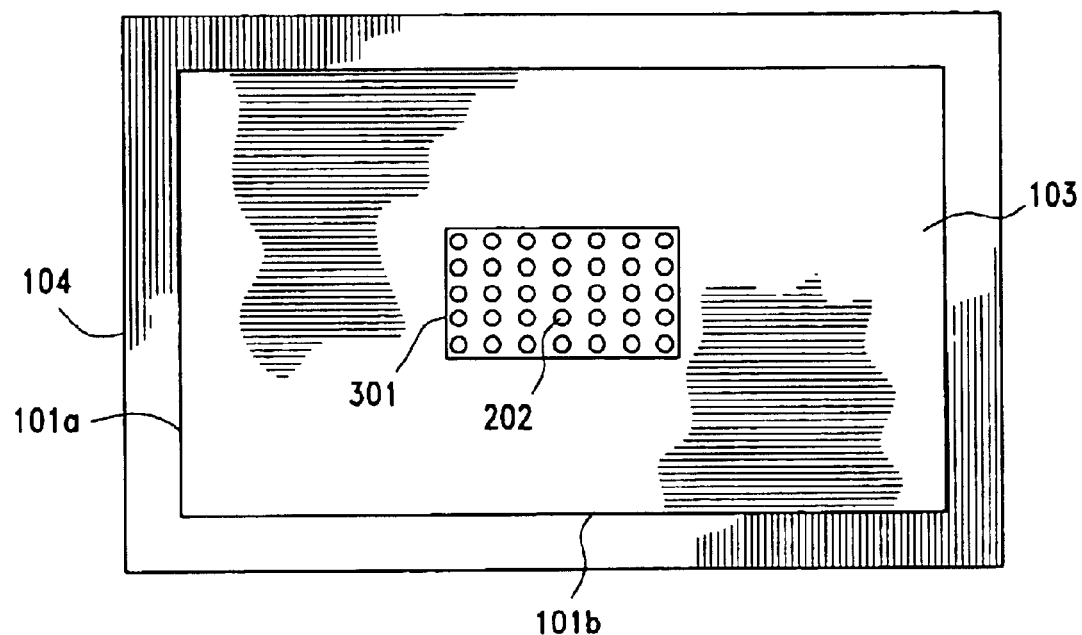
FIG. 3 shows a view of the bottom of the bee feeder, as viewed from the direction of arrows 3 in FIG. 2.

As shown in FIG. 3, the bottom 103 of the housing has an array of these holes 202. This array may cover the entire surface of housing bottom 103, or a defined region 301 of the surface 103. These holes are large enough to allow the bees to access syrup which has been poured into the feeder, but small enough to prevent the viscous syrup from dripping through the bottom of the feeder. The bees feeding at the feeder can reach the syrup by passing their tongues through the holes 202. The thickness of the housing bottom 103 is therefore dependent on the length of the bees' tongues. It is well known that the length of a honeybee's tongue is comparatively short, with a length of about 6 millimeters (mm). Bumblebees have longer tongues, in some cases up to 10 mm. Therefore, the thickness of the housing bottom can conveniently be anywhere from 1 to 4 mm without significantly impeding the ability of the bees to reach the syrup. A more preferred range for the thickness of bottom surface 103 is from 2 to 3.5 mm.

If preferred, the bottom 103 does not have to have a constant thickness. The area 301 of the surface through which holes 202 pass may be from 1 to 4 mm thick, allowing bees to reach through the holes. The remaining portion of surface 103 may be made thicker, for extra strength. The holes 202 must be wide enough to allow the bees to pass their tongues therethrough, and typically have a diameter of between 0.2 mm and 0.5 mm, roughly corresponding to a size of between 24 gauge and 32 gauge, as defined by the American Wire Gauge (AWG) standard. In a most preferred embodiment, holes 202 are 28 or 29 gauge holes.

In use, the syrup is poured through port 201 into the housing. Cover 105 is then sealed in an air-tight fashion over port 201. The syrup is retained in the housing by the small size of holes 202, and also by air pressure, as a result of a vacuum forming over the syrup in the air-tight housing.

Figure 5:
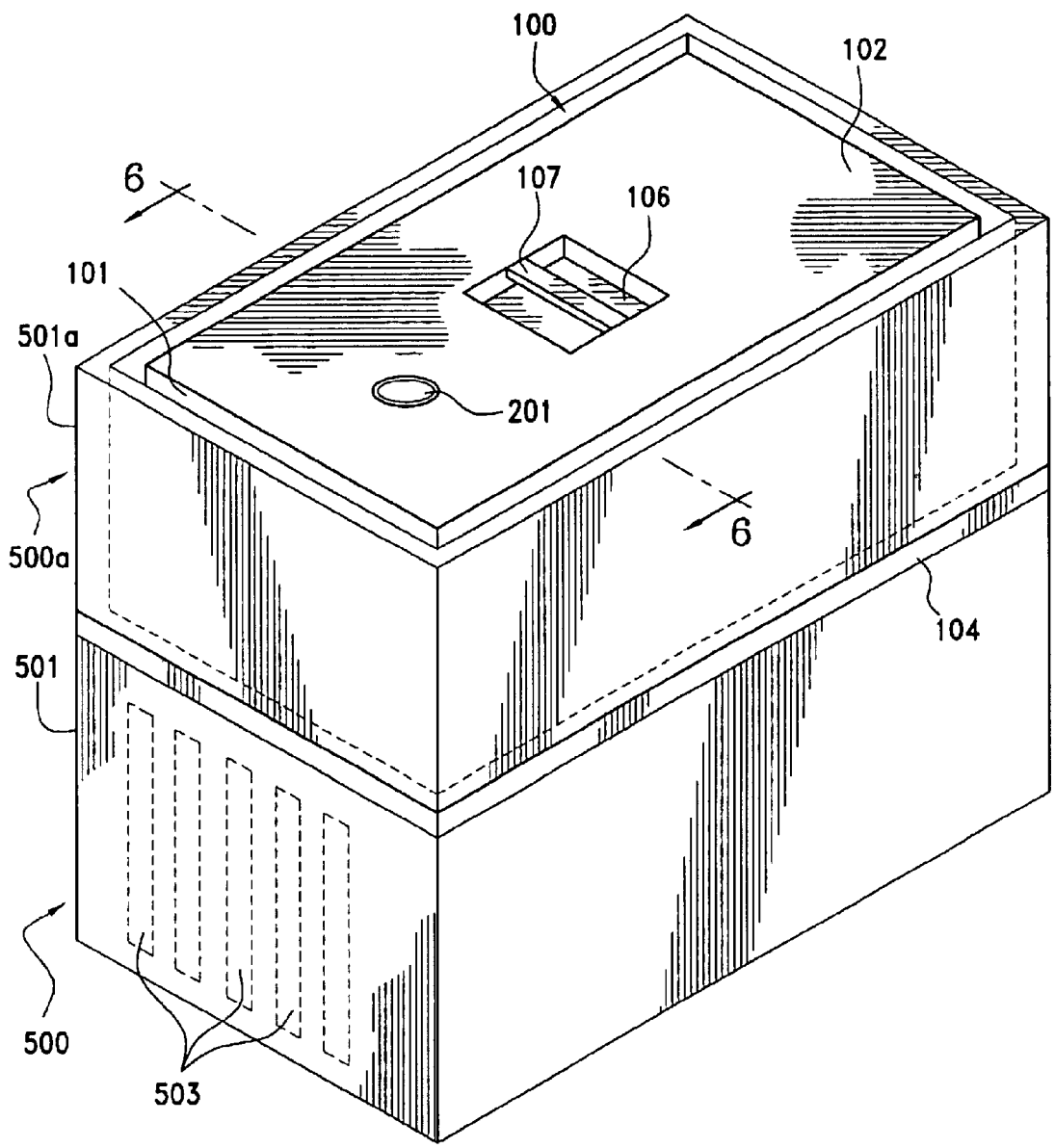
FIG. 5 shows a view of the inventive bee feeder positioned on an artificial bee hive structure.
Figure 6:
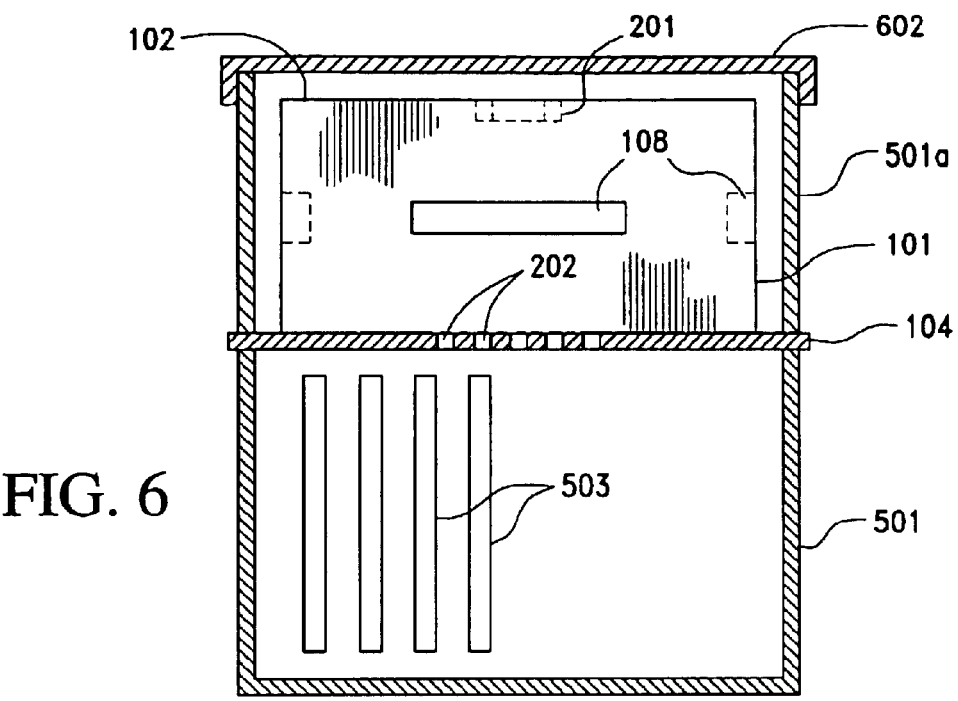
FIG. 6 shows a second view of the inventive bee feeder positioned on an artificial bee hive structure. This view is a cross section, taken in the direction of arrows 6 in FIG. 5.

As shown in FIGS. 5 and 6, the bee feeder is positioned directly on top of an artificial hive body 500, which serves as a brood chamber for the bees. The hive body 500 includes a housing 501 enclosing the hive, where housing 501 has an outer wall and an opening (not shown) in the bottom which allows the bees to leave the brood chamber. Within housing 501 is a plurality of frames 503, which are hung within the housing with a ⅜-inch gap therebetween (shown with broken lines in FIG. 5). The bee feeder is positioned on the outer wall of the housing 501 so that base 103 covers an opening in the top of housing 501, with holes 202 being positioned within easy reach of the bees, as shown in FIG. 6. Additionally, the flange 104 connected to wall 101 of the housing is positioned on the outer wall of housing 501. The flange is then secured in position by mounting a second hive body 500*a* having a housing 501*a* with an outer wall on the flange 104 so that flange 104 is positioned between the outer wall of lower housing 501 and the outer wall of upper housing 501*a*. A hive top 602, shown in FIG. 6, is positioned on top of housing 501*a*. The top may be completely removable, or the top may be opened by means of hinges. Once secured in position, the feeder may be refilled through port 201 without the need to risk agitating the bees in the hive by opening hive top 602. Also, since the bee feeder is not removed from housing 501*a* while refilling the feeder, there is a greatly reduced risk of exposing the bees to a cool external environment during the feeding process.

There is no need to rigidly mount the improved bee feeder to the lower hive body 500, making it easier for the beekeeper to adjust the positioning of the feeder relative to the hive body, if needed. Once the feeder is properly positioned, the bees within hive body 500 will effectively glue the feeder into position with propolis, or bee glue.

Figure 7:
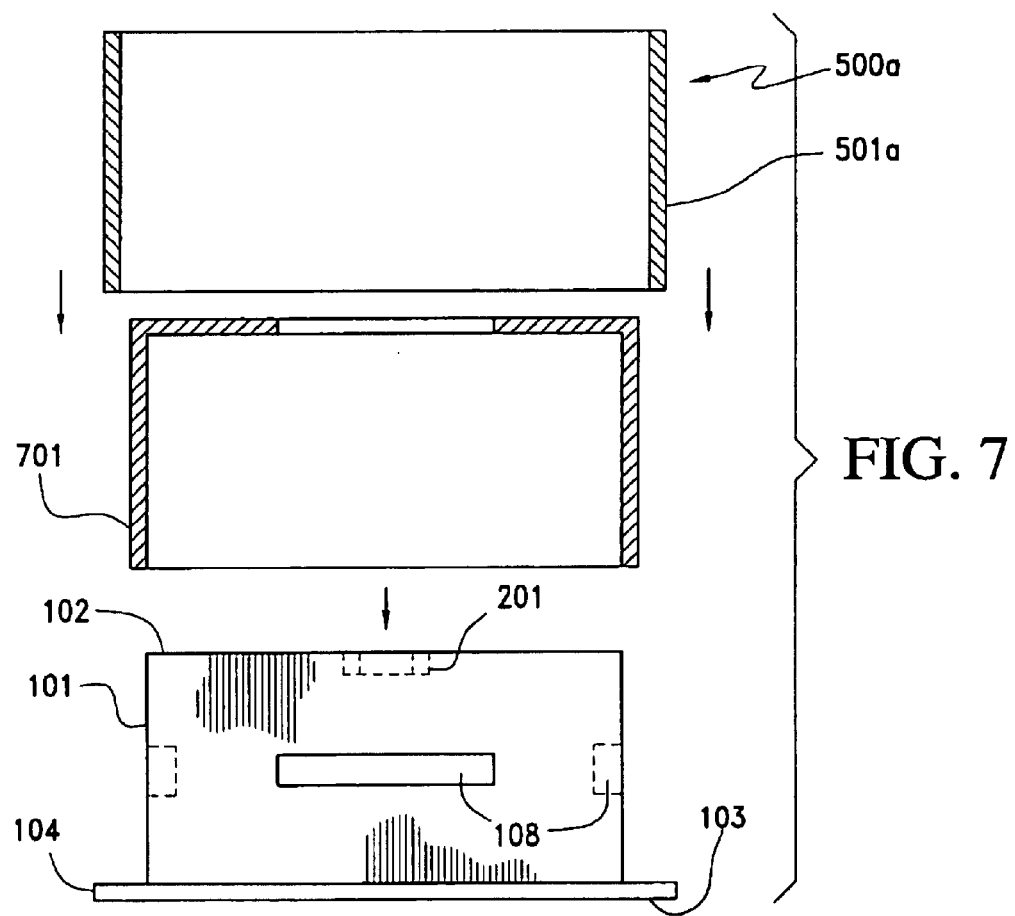
FIG. 7 is an exploded view showing how an insulating cover fits over the bee feeder.

An additional feature of the feeder is a removable insulating cover 701, shown in FIG. 7, which may be positioned between housing 501*a* of the hive body 500*a*, and the housing 100 of the feeder. In a preferred embodiment, the cover 701 covers the entire surface of sidewall 101, as well as the majority of top surface 102. However, an opening in the upper surface of cover 701 should be positioned over port 201. This allows cover 105 to be removed from the port so that syrup can be poured into the housing 100 without having to remove cover 701. In addition to being easier for the beekeeper, this substantially reduces the risk of disturbing the bees. Also, a second opening in the upper surface of cover 701 may be optionally positioned over well 106, allowing the beekeeper to conveniently grasp handle 107. Insulating cover 701 is typically made out of a closed-pore foamed polystyrene material. The cover is a rigid material, and may be colored black to increase heat absorbency. If a flexible material is preferred for cover 701, the cover may be made from laminate comprising a glass wool or fiberglass mat sandwiched between two layers of a woven or non-woven material, such as polyester or nylon. This flexible cover has the advantage that it is easier to store when not in use.

Insulating cover 701 helps reduce the flow of heat out of the hive through the feeder in cooler weather, thereby helping to maintain a roughly constant temperature within the hive. This helps maintain the health and productivity of the bees within the colony. The cover also helps minimize heat flow out of the hive and feeder when cover 105 is removed from port 201.

Figure 8:
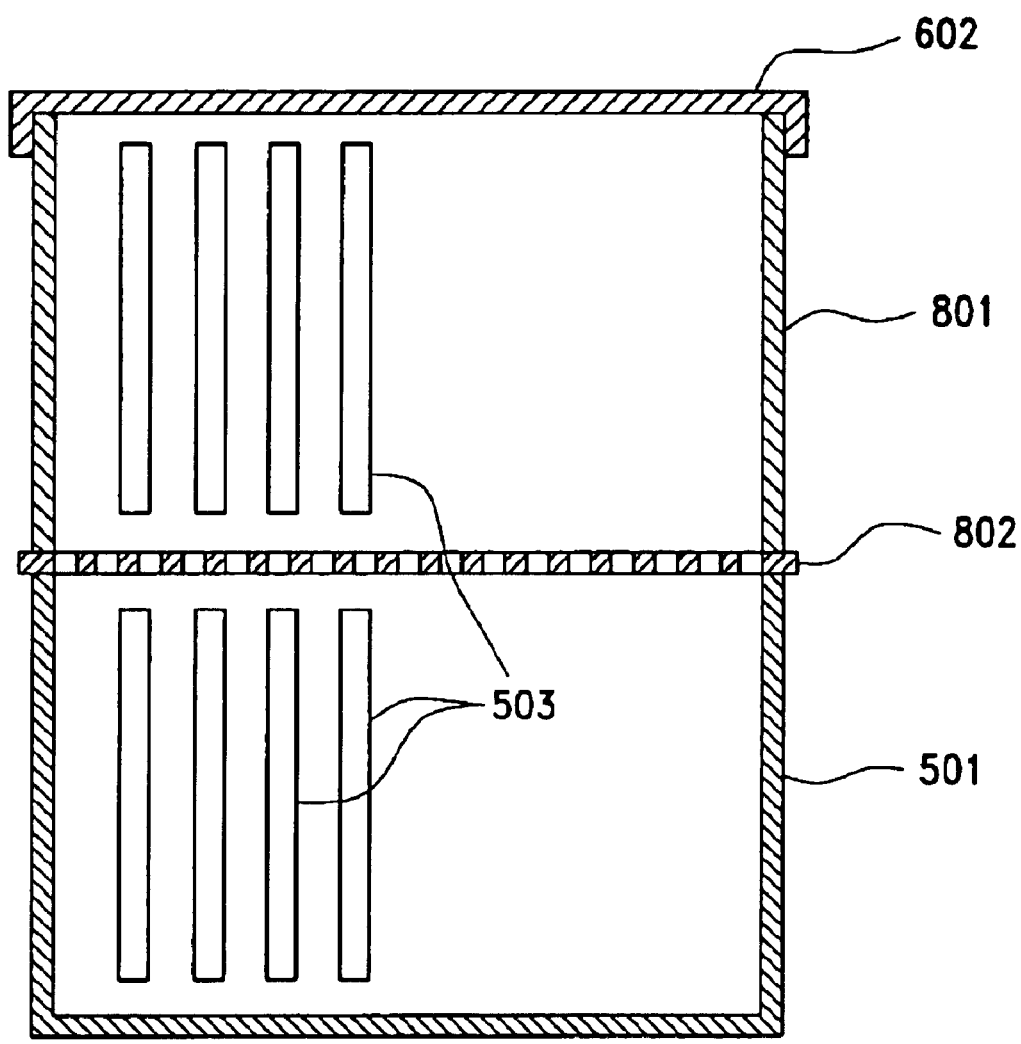
FIG. 8 shows a conventional bee hive for use with the feeder of the current invention.

The use of the inventive bee feeder will now be described. The bee keeper will normally maintain a colony of bees in an artificial bee hive, shown in FIG. 8. The artificial hive includes a first hive body 501 adapted to contain a queen bee and a plurality of worker bees, where the first hive body has an outer wall and an open top. An opening in the bottom of the first hive body (not shown) allows the worker bees to freely enter and leave the hive in search of nectar from plants. A second hive body 801 having an outer wall is mounted on top of the first hive body by positioning the outer wall of the second hive body on top of the outer wall of the first hive body. Both hive bodies 501 and 801 contain a plurality of frames 503, on which the worker bees will construct a comb. In between the two hive bodies is a queen excluder 802 (a metal grill, shown in cross section in FIG. 8), which prevents the queen bee from entering the second hive body. As a result, the queen bee is only able to lay eggs in the cells of the comb in the lower hive body 501, which serves as the brood chamber. The worker bees therefore use the cells in the comb of the second hive body to store honey. Cover 602 is then positioned on hive body 801

As long as the environment is conducive to honey production by the bees, the bee keeper allows the worker bees to store honey in the second hive body. However, in the fall and winter, when the mean temperature in the hive falls to a point that the bees begin to cluster, little or honey is produced by the bees. In fact, the bees will begin to consume the honey from the hive. At this point, the bee keeper should remove the second hive body from the artificial hive and replace it with the inventive bee feeder. This is done by positioning the outer wall of a feeder hive body 501*a* on top of the outer wall of the first hive body, with the mounting flange 104 being positioned therebetween, as shown in FIG. 6. Cover 602 is then positioned on hive body 501*a*. Through port 201, the interior of the chamber of the bee feeder housing is filled with a syrup which is palatable to bees. This syrup serves as an alternative food source for the bees. The bees feed on said syrup through the holes 202 in the bottom of the feeder. When the temperature in the hive rises to the point that the bees stop clustering and begin to produce honey again, the bee feeder assembly may be replaced with a second hive body to serve as a repository for honey.

Although the present invention has been described in detail with particular reference to preferred embodiments thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A device for feeding bees, comprising:
   a) a rigid heat-absorptive housing, said housing being adapted to fit inside of a first hive body;
   b) a chamber within said housing, said chamber having a bottom surface with a plurality of holes passing therethrough;
   c) at least one access port in said housing; and
   d) a means for mounting said housing on top of a second hive body, said mounting means being connected with one of a lower portion of a side wall of said housing and a bottom of said housing;
   wherein said plurality of holes in the bottom of said chamber are large enough to allow a bee to access a viscous syrup through said plurality of holes, but small enough to prevent the viscous syrup from dripping therethrough.

2. The device of claim 1, wherein the said plurality of holes in the bottom of said chamber have a gauge size between 26 and 32.

3. The device of claim 1, wherein the said plurality of holes in the bottom of said chamber are gauge 29.

4. A device for feeding bees, comprising:
   a) a rigid heat-absorptive housing comprising a continuous side wall, said housing being adapted to fit inside of a first hive body;
   b) a chamber within said housing, said chamber having a bottom surface with a plurality of holes passing therethrough;
   c) at least one access port in said housing; and
   d) a means for mounting said housing on top of a second hive body, said mounting means comprising a flange extending outwardly from said side wall, wherein said flange is adapted to be positioned on top of an outer wall of said second hive body, and beneath an outer wall of said first hive body;
   wherein said plurality of holes in the bottom of said chamber are large enough to allow a bee to access a viscous syrup through said plurality of holes, but small enough to prevent the viscous syrup from dripping therethrough.

5. The device of claim 4, wherein said housing further comprises a top surface having a handle thereon.

6. The device of claim 5, further comprising an insulating shell surrounding the side wall and the top of the housing.

7. The device of claim 6, wherein the insulating shell is made of foamed plastic.

8. The device of claim 5, further comprising a layer of polystyrene foam surrounding the side wall and the top of the housing.

9. A device for culturing bees, comprising:
   a) a first hive body adapted to contain bees, said first hive body having an outer wall and an open top;
   b) a second hive body mounted on top of the first hive body, said second hive body having an outer wall;
   c) a bee feeder mounted over the open top of the first hive body, said bee feeder comprising:
      1) a rigid heat-absorptive housing positioned inside the second hive body;
      2) a chamber within said housing, said chamber having a bottom surface with a plurality of holes passing therethrough;
      3) an access port in said housing, said port allowing a viscous syrup to be poured into said chamber, where said port may be reversibly sealed; and
      4) a means for mounting said housing on top of the top surface of said first hive body, said mounting means being connected with one of a lower portion of a side wall of said housing and a bottom of said housing;
   wherein said plurality of holes in the bottom of said chamber are large enough to allow the bees within the hive to access the viscous syrup through said plurality of holes, but small enough to prevent the viscous syrup from dripping into the hive.

10. The device of claim 9, wherein the said plurality of holes in the bottom of said chamber have a gauge size between 26 and 32.

11. The device of claim 9, wherein the said plurality of holes in the bottom of said chamber are gauge 29.

12. A device for culturing bees, comprising:
    a) a first hive body adapted to contain bees, said first hive body having an outer wall and an open top;
    b) a second hive body mounted on top of the first hive body, said second hive body having an outer wall;
    c) a bee feeder mounted over the open top of the first hive body, said bee feeder comprising:
       1) a rigid heat-absorptive housing positioned inside the second hive body;
       2) a chamber within said housing, said chamber having a bottom surface with a plurality of holes passing therethrough;
       3) an access port in said housing said port allowing a viscous syrup to be poured into said chamber, where said port may be reversibly sealed; and
       4) a means for mounting said housing on top of the tot surface of said first hive body;
    wherein said plurality of holes in the bottom of said chamber are large enough to allow the bees within the hive to access the viscous syrup through said plurality of holes, but small enough to prevent the viscous syrup from dripping into the hive; and
    wherein said housing comprises a continuous side wall, and said mounting means comprises a flange extending outwardly from said side wall, said flange being positioned between the outer wall of the first hive body and the outer wall of the second hive body.

13. The device of claim 12, wherein said housing further comprises a top surface having a handle thereon.

14. The device of claim 13, further comprising an insulating shell between the housing and the second hive body.

15. The device of claim 14, wherein the insulating shell is made of foamed plastic.

16. The device of claim 13, further comprising a layer of polystyrene foam surrounding the side wall and the top of the housing.

17. A method of bee husbandry using a bee feeder assembly, said bee feeder assembly comprising:
    a feeder hive body having an outer wall and an open bottom;
    a rigid heat-absorptive housing positioned inside of the feeder hive body;
    a chamber within said housing, said chamber having a bottom surface with a plurality of holes therethrough;
    at least one access port in said housing; and
    a mounting flange attached to the exterior of said housing;
    wherein said method comprises the steps of:
    a) maintaining a colony of bees in an artificial hive, said artificial hive comprising:
       a first hive body adapted to contain a queen bee and a plurality of worker bees, said first hive body having an outer wall and an open top;
       a second hive body mounted on top of the first hive body, said second hive body having an outer wall; and a means for allowing the worker bees, but not the queen bee, to enter the second hive body;

b) allowing the worker bees to store honey in the second hive body, c) removing the second hive body from the artificial hive when the average temperature falls below a predetermined level;

d) positioning the bee feeder assembly on said first hive body by positioning the outer wall of the feeder hive body on top of the outer wall of the first hive body, with the mounting flange being positioned therebetween;

e) filling the interior of the chamber with a syrup which is palatable to bees and allowing the bees to feed on said syrup through said plurality of holes; and f) replacing the bee feeder assembly with the second hive body when the average temperature rises above said predetermined level.

* * * * *